United States Patent [19]
Tachikawa

[11] Patent Number: 5,579,103
[45] Date of Patent: Nov. 26, 1996

[54] OPTICAL RADAR RANGER WITH MODULATION OF IMAGE SENSOR SENSITIVITY

[75] Inventor: Jin Tachikawa, Tokyo, Japan

[73] Assignee: Canon Kabushiki Kaisha, Tokyo, Japan

[21] Appl. No.: 356,147

[22] Filed: Dec. 15, 1994

[30]     Foreign Application Priority Data

Dec. 22, 1993   [JP]   Japan ................................... 5-324220

[51] Int. Cl.$^6$ .................................................. G01C 3/00
[52] U.S. Cl. ........................................ 356/5.1; 356/5.15
[58] Field of Search .................................. 356/4.01, 5.1, 356/5.15, 4.07; 367/123

[56]            References Cited

U.S. PATENT DOCUMENTS

| | | | |
|---|---|---|---|
| 4,915,498 | 4/1990 | Malek | 356/5.04 |
| 4,935,616 | 6/1990 | Scott | 250/214 VT |
| 4,957,362 | 9/1992 | Peterson | 356/5.14 |
| 5,164,733 | 11/1992 | Nettleton et al. | 342/54 |

FOREIGN PATENT DOCUMENTS 63-53443   7/1988   Japan .

OTHER PUBLICATIONS

C. B. Johnson, C. E. Catchpole and C. C. Matle, IEEE Trans., ED-18, 11, p. 1113, (1971).

D. L. Emberson, Adv. In E. and E. Phys., 33A, p. 133, (1972), Academic Press, London and New York.

*Primary Examiner*—Stephen C. Buczinski
*Assistant Examiner*—Pinchus M. Laufer
*Attorney, Agent, or Firm*—Morgan & Finnegan L.L.P.

[57]         ABSTRACT

According to the present invention, there is provided an optical radar in which a beam intensity-changed with a preset waveform and having a two-dimensional spread is irradiated on a target measurement object, an optical image of light reflected by the target measurement object is formed on the light-receiving surface of an image pickup element having a sensitivity modulation function and is photoelectrically converted, the sensitivity of the image pickup element is modulated with the preset waveform using the sensitivity modulation function of the image pickup element, distances to respective points of the target measurement object are obtained from light amount signals from the respective points of the target measurement object, which signals are output from the image pickup element, thereby measuring the shape of the target measurement object, wherein distances to the respective points of the target measurement object are obtained from the plurality of light amount values of the respective points of the target measurement object, which light amount values are obtained by shifting the difference between the phase of the intensity change in the beam and the sensitivity modulation phase of the image pickup element a plurality of times.

6 Claims, 6 Drawing Sheets

OPTICAL RADAR RANGER WITH MODULATION OF IMAGE SENSOR SENSITIVITY

BACKGROUND OF THE INVENTION

The present invention relates to an optical radar for measuring and inspecting a distance to a target measurement object and its shape and, more particularly, to an optical radar having an optical surface sensor and capable of obtaining a light return time difference as a phase change amount in signal processing, thereby obtaining distance/shape data at high speed.

An optical radar is a technique for measuring a change in propagation time until emitted light becomes incident on a measurement target and reaches a sensor, by directly measuring the propagation time of one optical pulse or by indirectly measuring propagation times as phase change amounts of an optical pulse train emitted and reaching a sensor, and for obtaining a change in distance to the measurement object or its shape in accordance with a propagation time difference.

A conventional optical radar represented by a laser radar has been used to measure the shapes of a construction (e.g., a dam) and an airplane wing. Along with the recent advance in high-frequency techniques and optoelectronic techniques, optical radars have also been used to measure the shapes of nearer objects.

The state-of-the-art optical radar light-receiving portion as the main feature of the present invention will be briefly described below.

Figure 1:
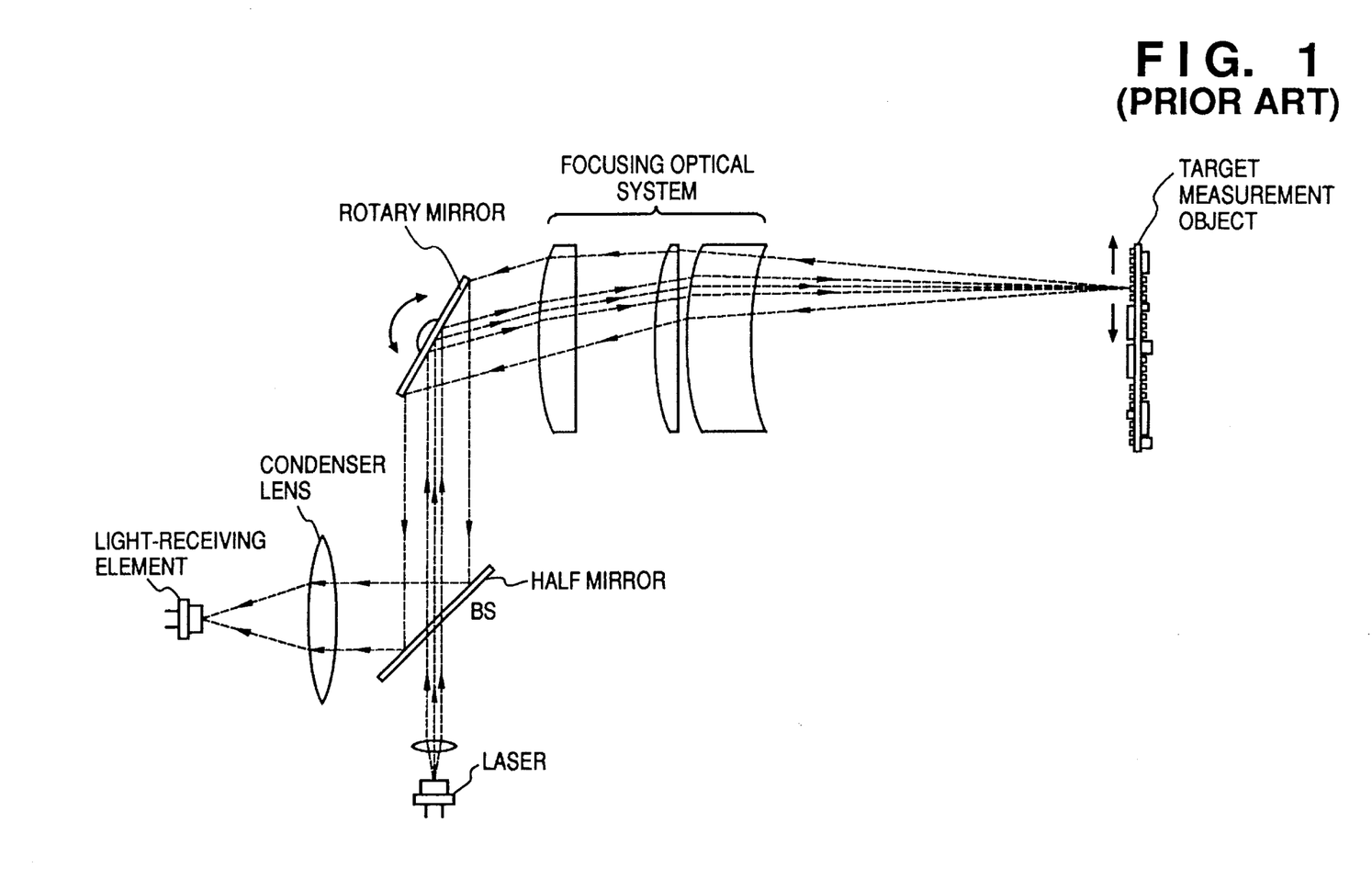
FIG. 1 is a view showing the arrangement of a conventional scanning laser radar.

An optical radar requires some high-speed light-receiving element for detecting and measuring arrival of sensing light. Unlike in a CCD camera, a high-speed photodiode and a photo multiplier, which have been conventionally popular, cannot be two-dimensionally arranged in the state of the art while maintaining high-speed characteristics. For this reason, according to a conventional implementation, as shown in FIG. 1, at least one of irradiated and reflected beams is scanned with a rotary mirror to measure the shape of an object using one light-receiving element.

Some optical surface sensors are still used at present and will be compared with each other below.

Conventional popular surface-light-receiving type methods of measuring changes in light amounts are represented by the following typical examples.

1) Television camera
2) Mechanical scanning by an optical sensor
3) Image dissector (electron tube random access camera)
4) Streak camera In the above examples, the television camera 1) is the most popular and lowest in cost. However, the intensity of a certain pixel cannot be sampled at the frame rate (1/30 sec in the NTSC scheme) or faster. For this reason, it is impossible to measure the phase of reflected light of a laser radar which generally changes at about 1 GHz.

In recent years, even in a CCD with the most advanced shutter function, it is often difficult to measure a change in light amount of a frequency largely exceeding MHz due to the sensitivity limitations.

The mechanical scanning 2) is two-dimensional scanning of a high-speed photodiode using a moving stage. With this arrangement, the distribution of return time differences of surface beams can be relatively easily measured. It is still difficult to realize high-speed scanning. Therefore, this mechanical scanning has a problem on simultaneity in measurement.

The random access camera 3) is used in a heterodyne interferometer for measuring modulated light of about 100 kHz and has achieved good results. At present, however, the random access camera cannot cope with a modulation frequency on the order of about GHz. In addition, since the random access camera continuously repeats point measurements, the phases of points within the entire field angle cannot be simultaneously measured, and errors tend to occur with a lapse of time.

The streak camera 4) is suitable for recording a change in ultra-high-speed phenomenon as a function of time. This camera can naturally be used in distance measurement using light return time differences. However, a considerably large number of two-dimensional images must be obtained to obtain light return times within the entire field angle. To obtain a change in distance on the order of about mm, a time-resolving power of about 1 ps is required because the streak camera employs real-time analysis. At present, the streak camera results in a very expensive measuring system.

As described above, it is impossible for the conventional optical surface sensors to measure, with a high S/N ratio, reflected light whose intensity changes at high speed exceeding about 100 MHz, and to determine the phase at high speed with high precision.

The present applicant proposed a distance measuring method and apparatus using an image pickup means having a variable light amount/sensitivity function represented by an image intensifier with a gate, as disclosed in Japanese Patent Laid-Open No. 6-109418 entitled "Distance Measuring Method and Apparatus" (laid-open date: Apr. 19, 1994). The present invention is a proposal associated with the signal processing method in this former invention.

The present invention uses a sensor which is adapted to measure the modulation phase of a finitely spread, modulated two-dimensional beam of an optical radar without mechanical scanning. First of all, a general principle of phase measurement will be described below.

Assume that a target measurement signal is represented by a function f(t), and that the intensity and phase of one of the frequency components mixed in this signal are to be obtained. If a function f(t) consisting of a large number of angular frequency components ω has a normal signal form represented by a Fourier transforms this function is represented as follows:

$$f(t) = \int_0^\infty (A(\omega)\cos \omega t + B(\omega)\sin \omega t)d\omega$$

and its coefficients are defined as follows:

$$A(\omega) = \frac{1}{\pi} \int_{-\infty}^\infty f(t)\cos \omega t \, dt$$

$$B(\omega) = \frac{1}{\pi} \int_{-\infty}^\infty f(t)\sin \omega t \, dt$$

If two reference signals $\cos\omega_0 t$ and $\sin\omega_0 t$ are prepared to measure the phase of a frequency component $\omega_0$, and the following equations are obtained by a certain means:

$$PC = A(\omega_0) = \int f(t) \times \cos \omega_0 t \, dt$$

$$PS = B(\omega_0) = \int f(t) \times \sin \omega_0 t \, dt$$

the independent frequency components are eliminated, and a coefficient representing the ratio of the frequency component $\omega_0$ in the function f(t) is obtained.

If phase "0" is given for the reference signal $\sin\omega_0 t=0$, a phase $\theta$ of the frequency component $\omega_0$ is represented using PC and PS as follows:

$\theta=\tan^{-1}(PS/PC)$

The phase $\theta$ is represented as defined above to ignore a normalization constant by using a measurement value expressed in the form of PS/PC.

Note that a normalization value P for a measurement unit is expressed as follows:

$P=\sqrt{PS^2+PC^2}$ so that the phase can also be obtained as follows:

$\theta=\sin^{-1}(PS/P)$

If this value is represented by a voltage in units of V, P is equivalent to the effective value of the frequency component $\omega_0$.

Note that, in actually calculating arctangent and arcsine values, they must be determined under conditions in consideration of their definition and value ranges.

Figure 2:
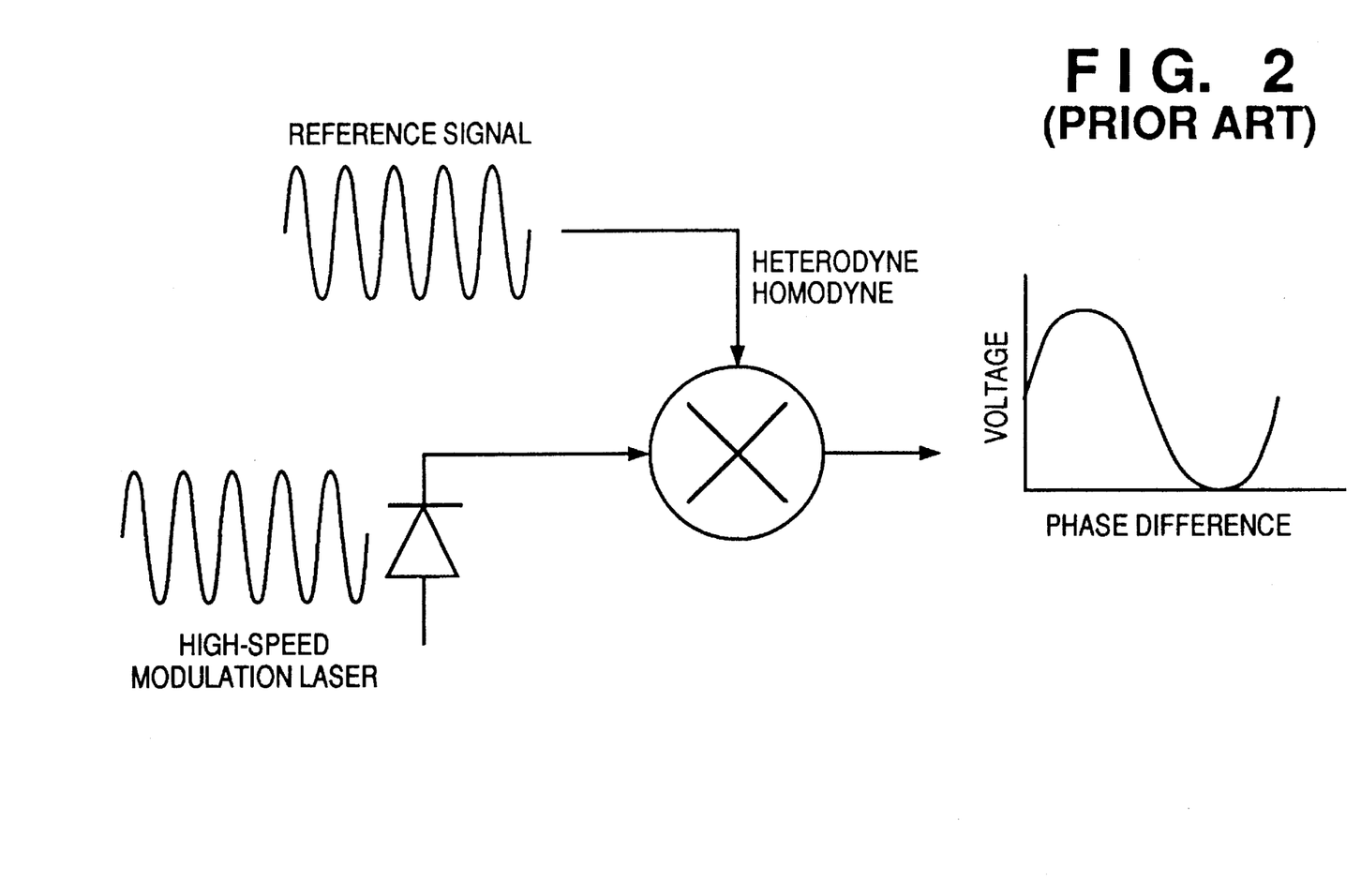
FIG. 2 is a view showing the arrangement of a conventional phase measurement circuit.

This method is used in the field of electronic and communication fields for a network analyzer, a lock-in amplifier, a measuring instrument (e.g., a phase meter or a wow and flutter meter), and various detectors. This method is one of the most fundamental principle of phase measurement. A circuit arrangement which employs this principle of phase measurement is shown in FIG. 2.

In an optical radar, using the phase obtained as described above, a distance difference $\underline{x}$ is defined as follows:

$x=\theta \cdot c/(2\pi f)$ ($x=\theta \cdot c/4\pi f$ for reciprocal measurement) where $\theta$ is the resultant phase difference, $\underline{f}$ is the modulation frequency, and $\underline{c}$ is the velocity of light.

If a signal is an electrical signal which changes as a function of time, the above multiplications can be easily achieved using a mixer, a switch, and the like.

It is, however, very difficult to perform multiplication for an object having a two-dimensional spread, such as an image.

For example, to obtain a resolution of 512×512 pixels like a television image, 250,000 or more mixers and switches are required. It is not easy to realize this circuit arrangement using even the current LSI techniques.

Modulation at 100 MHz or more is required to perform detection in an optical radar. It is difficult to synchronously drive a large number of switches at a high frequency because of the limitations of circuit constants.

As described above, the conventional optical surface sensor cannot be used in an optical radar.

SUMMARY OF THE INVENTION

The present invention has been made in consideration of the above situation, and has as its object to obtain the distance and shape of an object using the modulation function of a recently developed image intensifier with a modulation gate.

In order to solve the above problems and achieve the above object, an optical radar according to the present invention has the following characteristic arrangement.

That is, there is provided an optical radar in which a beam intensity-changed with a preset waveform and having a two-dimensional spread is irradiated on a target measurement object, an optical image of light reflected by the target measurement object is formed on a light-receiving surface of an image pickup element having a sensitivity modulation function and is photoelectrically converted, the sensitivity of the image pickup element is modulated with the preset waveform using the sensitivity modulation function of the image pickup element, distances to respective points of the target measurement object are obtained from light amount signals from the respective points of the target measurement object, which signals are output from the image pickup element, thereby measuring the shape of the target measurement object, wherein distances to the respective points of the target measurement object are obtained from the plurality of light amount values of the respective points of the target measurement object, which light amount values are obtained by shifting a difference between the phase of the intensity change in the beam and the sensitivity modulation phase of the image pickup element a plurality of times.

Other objects and advantages besides those discussed above shall be apparent to those skilled in the art from the description of a preferred embodiment of the invention which follows. In the description, reference is made to accompanying drawings, which form a part hereof, and which illustrate an example of the invention. Such example, however, is not exhaustive of the various embodiments of the invention, and therefore reference is made to the claims which follow the description for determining the scope of the invention.

DETAILED DESCRIPTION OF THE PREFERRED EMBODIMENTS

Preferred embodiments of the present invention will be described in detail with reference to the accompanying drawings.

(First Embodiment)

Figure 3:
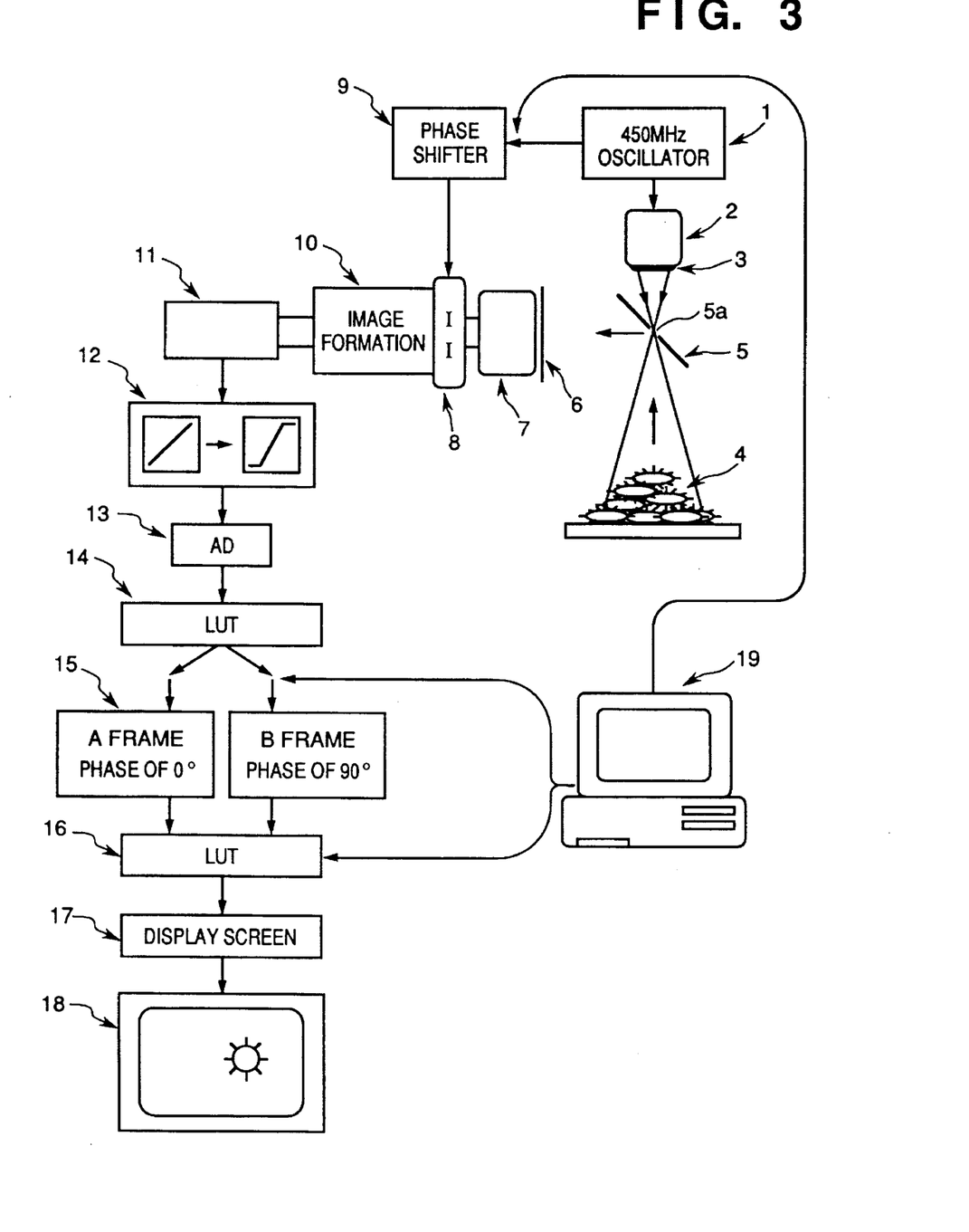
FIG. 3 is a view showing the arrangement of an optical radar according to an embodiment of the present invention.

FIG. 3 is a view showing the arrangement of an optical radar according to the first embodiment of the present invention.

Referring to FIG. 3, reference numeral 1 denotes a reference signal source for generating a signal for modulating the intensity of a laser; and 2, a laser, serving as a light source, for generating a laser beam (probe beam) intensity-modulated at high speed. For example, if the laser 2 is a laser diode directly modulated with a current, its modulation frequency is often selected in the range of 10 MHz to 3,000 MHz. If a laser is modulated by an external modulation element, the modulation frequency can be 10 GHz or more.

In this embodiment, a laser diode is directly modulated at 450 MHz. The modulated waveform preferably has a single frequency component which does not include frequency components of higher orders in view of the S/N ratio, but a single frequency component is not an indispensable condition. Reference numeral 3 denotes a lens for irradiating the probe beam; 4, an object as a target measurement object; 5, an apertured mirror for guiding the probe beam to a measurement system; and 6, a filter for transmitting only the wavelength of the probe beam. The filter 6 is manufactured to have a low angular dependency. Reference numeral 7 denotes an objective lens for focusing the probe beam; 8, an image intensifier with a modulation gate; 9, a phase shifter for changing the phase of a signal applied to the gate of the image intensifier; 10, an image formation lens for forming an output image of the image intensifier 8; 11, a CCD camera for converting an image of the image intensifier 8 into a television image (video signal formation); 12, an analog image processing device for adjusting the intensity and offset of the video signal; 13, an A/D converter for converting the video signal into a digital video signal; 14, a look-up table type digital converter (Look Up Table) for converting linearity of the digital signal; 15, a two-frame memory for storing two frame images; 16, a look-up table type digital converter for looking up the signal intensity of each point of the two images and outputting a digital value representing a phase from the signal intensity and the ratio of the intensities of the two images; 17, an image memory for storing and imaging the digital signal; 18, a monitor screen for outputting and displaying an image; and 19, a computer for updating the phase shift amount and the contents of the look-up tables.

The operation of the optical radar having the above arrangement will be described below.

When an RF power having a known frequency distribution and output from the signal source 1 is applied to the laser 2, a laser beam almost proportional to the injected power is emitted from the laser 2. The emitted laser beam is temporarily focused by the lens 3, passes through a central aperture 5a of the apertured mirror 5, and is irradiated on a measurement object 4 while being diverged. Of all the light components reflected and scattered by the measurement object 4, some components closer to the direction of regular reflection are reflected by the apertured mirror 5 and directed toward the measurement system.

The filter 6 shields unnecessary light such as fluorescent light and passes only a laser beam. Note that a filter has a film structure which hardly changes the transmittance even with a change in incident angle because a difference in an image light amount distribution increases with a high transmission angle dependency of the wavelength in the filter 6. The objective lens 7 forms the image of the measurement object 4 on the photoelectric surface of the image intensifier 8. Photoelectric conversion is performed on this photoelectric surface, and electrons are emitted in an amount proportional to the intensity of each point of the image.

On the other hand, a modulated signal generated based on the modulation frequency of the laser beam is phase-shifted by the phase shifter 9 (to be described in detail later). The phase-shifted signal is input to the image intensifier 8.

Figure 4:
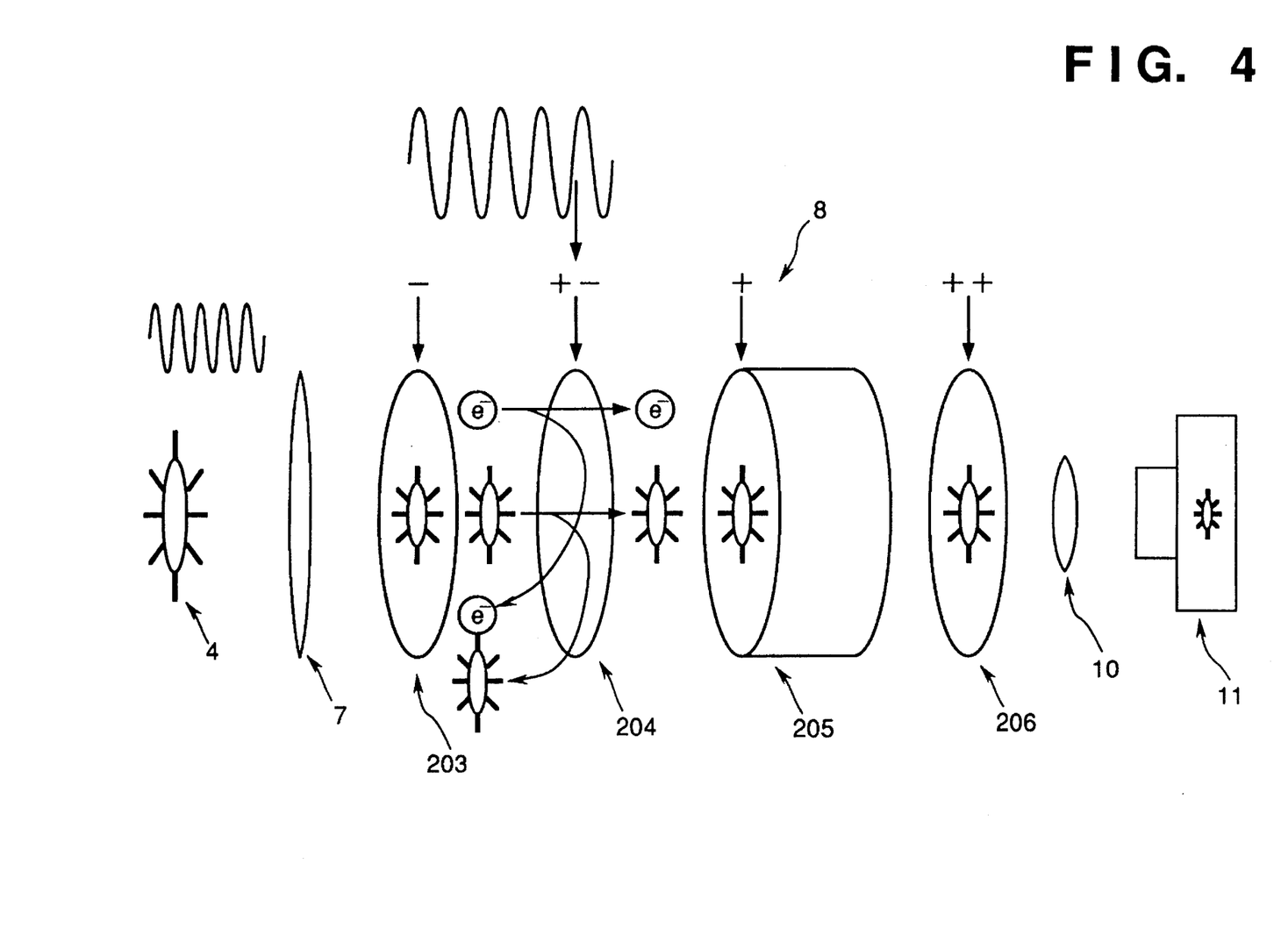
FIG. 4 is a view for explaining the operation of an image intensifier.

The image intensifier 8 has an electrode for a modulation gate 204 therein, as shown in FIG. 4, and electrons in an amount proportional to the potential of the modulated signal reach a fluorescent screen 206 of the image intensifier 8. The incident light amount is multiplied with the modulated signal in the image intensifier 8. The product is displayed on the fluorescent screen 206 of the image intensifier. Referring to FIG. 4, reference numeral 203 denotes a photoelectric surface of the image intensifier; and 205, an MCP of the image intensifier 8.

If the phase of the intensity of a laser beam reaching the photoelectric source 203 of the image intensifier 8 is equal to that of the intensity of the modulated signal, the number of electrons reaching the photoelectric surface 206 becomes maximum. If the phase of the intensity of the laser beam reaching the photoelectric surface 203 is shifted from that of the modulated signal by 180°, the number of electrons becomes minimum.

It should be noted that the reflectances at the measurement points of the measurement object 4 are not equal to each other. For this reason, portions having the same brightness on the fluorescent screen 206 are not always in phase. A method of solving this problem will be described later.

The fluorescent image as the multiplication result is formed on the light-receiving surface of the CCD camera 11 by the image formation lens 10 and converted into a video signal.

The video signal is not necessarily set to 0 V for a minimum light amount. In addition, nonlinearity is present in the video signal. The analog image processing device 12 adjusts the video signal such that the light amount changes in a sinusoidal manner ($\sin\theta+1 \geq 0$) with a change in phase. Thereafter, the A/D converter 13 converts the resultant video signal into a digital signal corresponding to each position of the CCD.

The remaining offset and nonlinearity of the digital signal are corrected by the digital signal processing device 14, and the corrected signal is stored in one frame memory bank of the two-frame memory 15 capable of storing two frames images.

Assume that one and the other frame memory banks of the two-frame memory 15 are defined as A and B, respectively, that the intensity of a pixel N at a given position stored in the memory bank A is defined as a(N), and that the intensity of an identical pixel stored in the memory bank B is defined as b(N).

If the phase of a modulated signal applied to the image intensifier 8 to store a video signal in the memory bank B is shifted from that stored in the memory bank A by 90°, a(N) and b(N) are orthogonal.

In this case, this function is a sine function having a minimum value of 0 like a function $\sin\theta+1$, and the sine function behaves as follows with respect to the phase θ:

$$a(N) = p(\sin\theta + 1)$$

$$b(N) = p(\cos\theta + 1)$$

Figure 5:
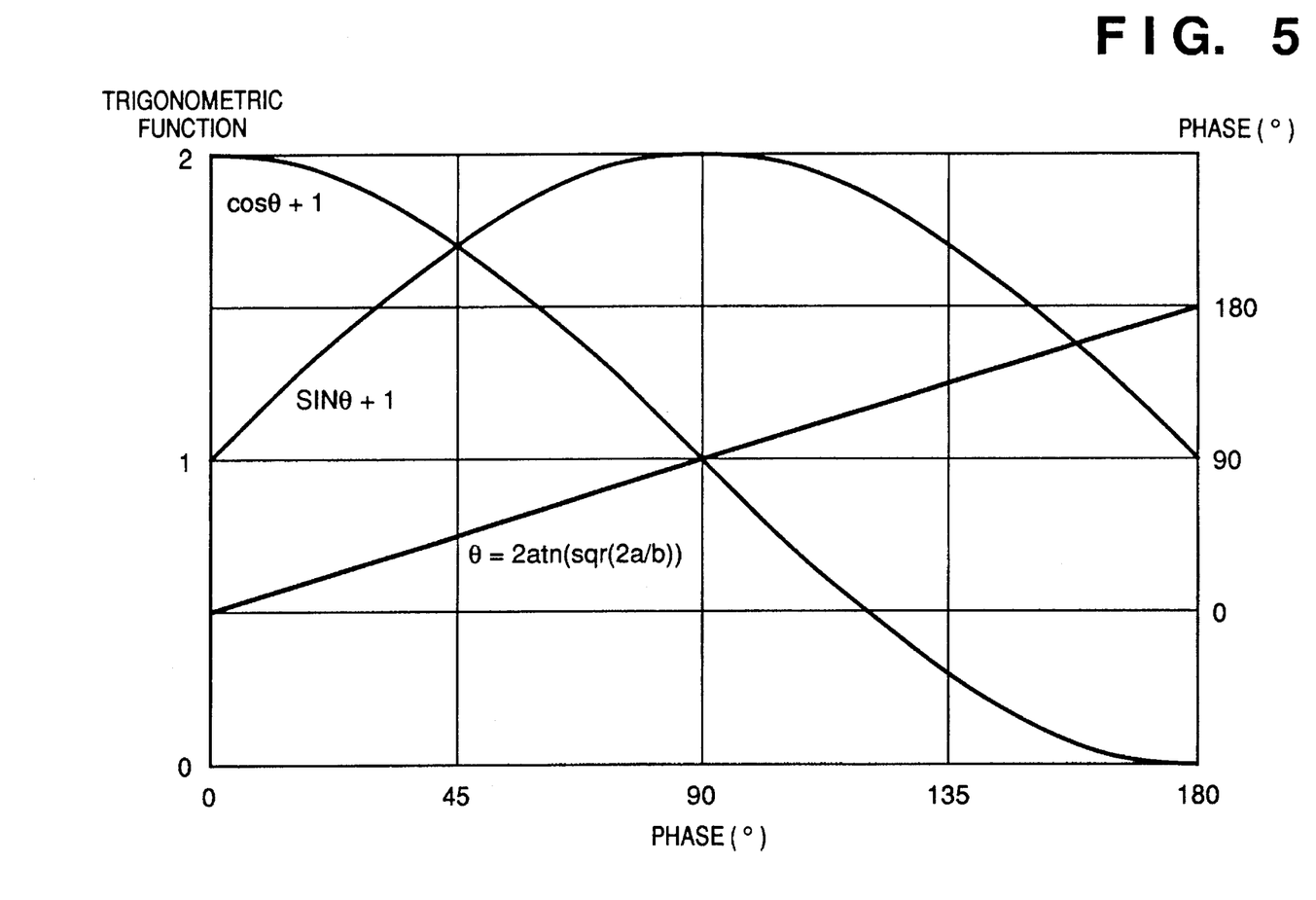
FIG. 5 is a view for explaining a method for obtaining a phase.

Using these two values, the phase θ is obtained as shown in FIG. 5:

$$\theta = 2\tan^{-1}\left(\sqrt{2a(N)/b(N)} - 1\right)$$

where p is a coefficient proportional to the reflected light amount. The coefficient p corresponds to the density at each measurement point. If p is obtained in place of θ, an image corresponding to a normal monochrome image can be obtained.

Since a trigonometric function is a periodic function, a phase difference which has the same output repeatedly appears. Therefore, a correspondence between a given measurement value and a specific location in phase repetition cannot be determined. However, satisfactory results can often be obtained if a distance range is set. The phase range can be limited by a technique for obtaining phases at a plurality of frequencies.

The phase shifter 9 is used to shift the phase by 90°. The phase shifter 9 comprises a mixer obtained by generally using an inductive part and an RF diode. The bias voltage of the diode is changed to change the phase. With such a simple structure, it is possible for a computer or the like to change the phase of the gate modulated signal for the image intensifier 8.

The above trigonometric function can be calculated using a computer. However, it is difficult for a current low-end CPU to perform the calculation at the same rate as that of the video signal. The look-up table type digital converter 16 is used to output digital data corresponding to θ upon reception of a(N) and b(N). The digital data is written as distance information in the two-frame memory 17 at high speed and output to the display monitor screen 18.

The contents of the memory 17 are used for industrial equipments (not shown) or a computer graphics device (not shown). These contents can be processed by the computer 19 and can be displayed in a more readable display means format such as a shape display using colors, or a contour display.

The following effects can be obtained by the embodiment described above.

1) One trend is to modulate an entire surface using the most advanced devices such as a liquid crystal shutter and an AO·EO modulation element. However, currently available liquid shutters prevent high-speed operation, and the AO element prevents a large field angle. For this reason, problems are posed if light having a television camera size is to be phase-detected at 100 MHz or more.

To the contrary, an image intensifier with a gate can easily provide a large screen and can realize the structure of the above embodiment easiest at present.

2) Since the optical radar of this embodiment has the phase shifter 9, measurement can be performed using arbitrary data except for a phase change within a range from 0° to 90°. In this case, the number of frames is not limited to two.

3) Since divergent light and an apertured mirror are used, an object at an arbitrary distance can be measured with almost the same view field.

4) Since the optical radar of this embodiment has a filter, excessive light is not guided to the image intensifier, so the service life of the image intensifier is not undesirably shortened, or the S/N ratio is not be reduced.

5) Since the image intensifier has an amplification action, a sufficient brightness is obtained even if a very weak laser source is used.

6) Since analog image processing is performed to correct the offset prior to A/D conversion, a sufficiently high S/N ratio can be attained with a limited number of A/D threshold levels.

7) Since a trigonometric transform is calculated using a look-up table type digital converter, distance information can be obtained at high speed.

8) Since the contents of the look-up table type digital converter can be programmable, an actual monochrome image can be obtained in addition to the phase.

(Second Embodiment)

Figure 6:
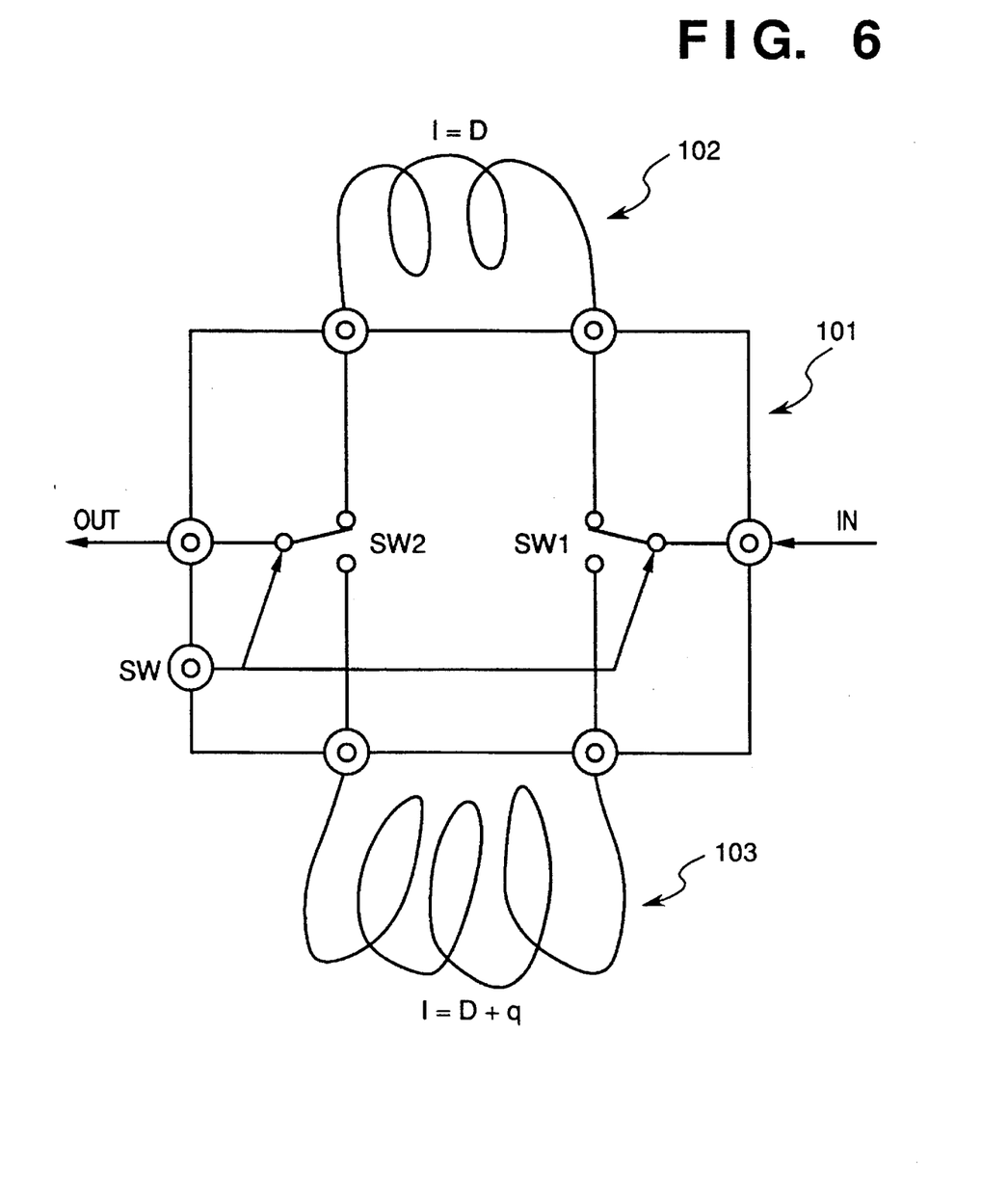
FIG. 6 is a view showing the arrangement of a delay line according to the second embodiment.

FIG. 6 is a view showing a phase shifter according to the second embodiment of the present invention. The phase shifter is obtained by simplifying the phase shifter 9 in FIG. 3.

Referring to FIG. 6, reference numeral 101 denotes an RF line switch; 102, a short line; and 103, a long line.

Referring to FIG. 6, when a modulated signal input to the switch 101 is to load an image in a frame bank A in a two-frame memory 15, a computer 19 controls to switch the phase shifter to the short line 102. When the modulated signal is to load an image in a frame bank B, the computer 19 controls to switch the phase shifter to the long line 103.

Assume that the difference between the lengths of the long and short lines, the signal speed in each line, and the modulation frequency are defined as q, V, and f, respectively. In this case, if the length of a line such as the length of a coaxial cord is set to satisfy the following relation:

$$q=(\pi V/2)/(2\pi f)=V/4f$$

a phase difference of 90° ($\pi/2$) is obtained. A signal input to the gate of an image intensifier 8 is also phase-shifted by 90°.

With the above arrangement, the phase difference can be obtained using wiring cables and RF switches, and a high-speed phase change can be realized at low cost. In addition, since a complicated circuit arrangement is not required, a system which is resistant to factors (e.g., temperature and voltage) which interfere with long-term stability can be created.

According to this embodiment, an electric line is used as a delay line, but an optical fiber or a waveguide may be used as a delay line to obtain identical or better delay characteristics, as a matter of course.

Two image intensifiers may be arranged at conjugate positions, and signals having a phase difference of 90° are applied thereto to obtain the same effect as described above. At this time, distance measurement can be performed simultaneous with photometry.

Note that the present invention may be applied to a system constituted by a plurality of equipments or an apparatus constituted by one equipment. The present invention can also be achieved by supplying a program to the system or apparatus.

The present invention is also applicable to changes or modifications of the above embodiments without departing from the spirit and scope of the invention.

As has been described above, according to the above embodiments, the shape of an object within a view field equivalent to that of an image pickup device and a distance to the object can be obtained without any mechanical scanning at a high speed almost equal to that of a general image pickup device such as a television camera.

The present invention is not limited to the above embodiments and various changes and modifications can be made within the spirit and scope of the present invention. Therefore, to apprise the public of the scope of the present invention the following claims are made.

What is claimed is:

1. An optical radar comprising:

first modulating means for modulating a beam intensity with a first waveform;

irradiating means for irradiating a target object with said beam;

image pickup means for photoelectrically converting an optical image of the target object;

second modulating means for modulating the sensitivity of said image pickup means with a second waveform;

measuring means for measuring distances to the respective points of the target object from the plurality of light amount values of the respective points of the target object, which light amount values are obtained by shifting a difference between the phase of the first and second waveform a plurality of times.

2. The radar according to claim 1, wherein said image pickup means is an image intensifier with a modulation gate.

3. The radar according to claim 1, wherein means for changing the difference between the phase of the first and second waveform is an RF phase shifter.

4. The radar according to claim 1, wherein means for changing the difference between the phase of the first and second waveform is a line switching device using an RF circuit switch.

5. The radar according to claim 1, wherein means for changing the difference between the phase of the first and second waveform is a line switching device using an optical waveguide switch.

6. The radar according to claim 1, wherein said image pickup means comprises a plurality of image pickup elements for simultaneously obtaining light amount signals whose phase differences are different.

* * * * *

UNITED STATES PATENT AND TRADEMARK OFFICE
CERTIFICATE OF CORRECTION

PATENT NO. : 5,579,103
DATED : November 26, 1996
INVENTOR(S) : Jin Tachikawa

It is certified that error appears in the above-indentified patent and that said Letters Patent is hereby corrected as shown below:

column 3, line 37, delete "($2\pi f$)" and insert therefor -- "$2\pi F$" -- column 7, line 27, after "such as" delete "a"

column 7, line 27, delete "shutter" and insert therefor -- shutters --

Signed and Sealed this

Eleventh Day of March, 1997

Attest:

BRUCE LEHMAN

*Attesting Officer*     *Commissioner of Patents and Trademarks*